United States Patent [19]

Lyons et al.

[11] 4,275,754
[45] Jun. 30, 1981

[54] AUTOMATIC VALVE ACTUATOR

[75] Inventors: Jerry L. Lyons; Denny W. Mertz, both of St. Louis County, Mo.

[73] Assignee: Essex Cryogenics of Missouri, Inc., St. Louis, Mo.

[21] Appl. No.: 930,051

[22] Filed: Aug. 1, 1978

[51] Int. Cl.³ .................................................. F16K 17/40
[52] U.S. Cl. ...................................... 137/75; 137/77; 137/78.5
[58] Field of Search .............................. 137/72, 75–77, 137/65, 73, 74, 78 R, 78 B, 78 C, 78.5, 79, 80; 126/287.5; 251/74; 169/19, 42

[56] References Cited

U.S. PATENT DOCUMENTS

| | | | |
|---|---|---|---|
| 725,827 | 4/1903 | Cowles | 137/76 X |
| 981,844 | 1/1911 | Dearing | 137/65 |
| 998,507 | 7/1911 | Hasty | 137/76 |
| 1,039,693 | 10/1912 | Burlingame et al. | 137/77 |
| 1,546,637 | 7/1925 | Ernst | 137/77 |
| 1,633,813 | 6/1927 | Hawley | 137/75 |
| 1,831,021 | 11/1931 | Markel | 137/65 |
| 1,840,959 | 1/1932 | Kraft | 137/75 |
| 3,538,929 | 11/1970 | Botkin | 137/77 |
| 3,874,859 | 4/1975 | Krause | 251/292 X |

FOREIGN PATENT DOCUMENTS

427268  4/1935  United Kingdom ........................ 137/75

Primary Examiner—William R. Cline
Assistant Examiner—H. Jay Spiegel
Attorney, Agent, or Firm—Kalish & Gilster

[57] ABSTRACT

A valve actuator provides preselected automatic spring-powered actuation of a rotary-actuated valve in response to fire, or other occurrence of a specific exigent type. The actuator is secured to a valve having a shaft extending from the valve body and rotatable through a predetermined rotational extent, e.g. 90°, for moving a valve element between open and shut portions. The actuator comprises a coiled or spiral torsion spring in an enclosure protectively covering the spring. One end of the spring is secured relative to the cover. A coupling is operatively connected to the other end of the spring and biased by spring force for being drivingly rotated for valve actuation. A camming arrangement holds the coupling against rotation by camming force against the spring force, a releasable link being operatively interconnected with the camming arrangement for maintaining the camming force. The link releases in response to the fire or other exigent occurrence exterior to the cover for releasably permitting rotation of the coupling. The actuator includes structure for securing the actuator to the valve body, with the coupling providing lost arcuate motion coupling to the shaft for causing rotation of the shaft through a desired angular extent for closing the valve, opening it, or causing it to fail in an "as was" position as desired. The lost arcuate motion coupling permits normal rotation of the shaft without the shaft being subjected to said spring force.

18 Claims, 23 Drawing Figures

AUTOMATIC VALVE ACTUATOR

SUMMARY AND BACKGROUND OF THE INVENTION

The present invention relates to valve actuators, and more particularly, to an automatic valve actuator of the spring operated type for actuating a rotary actuated valve automatically in response to an occurrence of exigent character, such as fire.

It has been known to provide automatic valve actuators for causing automatic actuation of a rotary valve in the event of fire causing melting of a heat-actuated fusible link. Such valve actuators have not been altogether successful in that they either do not permit normal valving or interfere with normal operation of the valve. For example, if the actuator incorporates a spring, such spring may increase the operating force of the valve handle during normal operating conditions by imposing a torque upon the valve actuation shaft.

Salmon U.S. Pat. No. 1,026,884 discloses a fluid shut off apparatus which is simply a valve having an actuating handle with a weight attached thereto, there being a fusible support for maintaining the handle in a position permitting flow through the valve, the fusible support permitting the handle to swing in response to gravity upon sufficient heat. In addition, the arrangement provides for manual release of the handle. However, the latter mechanism precludes normal operation of the valve. Although the fusible mechanism can be released manually to permit manual operation, when this occurs the valve fusible arrangement is no longer operative and protection against fire is not present, until the apparatus is reset with the valve actuating arm once more being maintained in position by the fusible support.

An automatically operable valve is taught by Hasty U.S. Pat. No. 998,507. The apparatus described therein included a fusible joint. In addition, it had the advantage of having provision for applying heat to the fusible joint from a source of electrical current. However, no normal valving operation was provided, the valve disclosed being incapable of providing manual valve operation, that is, the valve element was either open or closed with the closed condition occurring only in response to melting of the fusible joint in response to heat in the environment, as from a fire, or heat supplied by an electrical current.

Arrangements such as the latter effectively require that a separate valve be utilized in conjunction with the automatically actuated valve, if normal valving with manual preselection of the valving function is to be provided. The use of both manual and automatic valving arrangements in such a redundant fashion is expensive and cumbersome and increases plumbing complexity.

In numerous industrial applications, the increasingly more stringent regulations relative to the health and safety of employees, as well as those intended to prevent an environmentally hazardous, destructive condition which may cause pollution, necessitates the provision of fire-safe valves or other arrangements for causing automatic valve actuation in response to various occurrences of exigent character, such as fire, smoke, excessive heat, and various other conditions which may be detected by personnel, or by equipment particularly suited for being responsive to a condition to be monitored.

When existing valving arrangements are desired to be provided with automatic actuation facilities, it is heretofore not been convenient or practical to modify existing valves so as to be actuated automatically. Instead, separate valves having valve actuators integral therewith have been used for this purpose. It has been proposed to simply equip a valve with a spring return and to install a fusible link for causing the valve to remain open unless the link should be mounted, as by excessive heat, thereby permitting the spring loading to return the valve to a closed position.

Botkin U.S. Pat. No. 3,538,929 represents an attempt to provide a valve actuator which permits the valve handle of a conventional rotary actuated valve to be operated in the normal manner. This spring tension is released by a fusible link. This releases a head which rotates so that projections of the head engage projections on the valve operating handle thereby to move the valve to a closed position.

The valve actuator disclosed in the above-identified patent, while providing the advantage of not interfering with normal operation of a valve, has the disadvantage of requiring multiple heat sensitive links of a fusible type which are oriented in a position making them difficult to replace. Additionally, the valve actuating springs and other elements are exposed to the elements and the actuator is not compact, nor is it amenable for being mounted directly to the body of the valve. Additionally, the latter actuator is disclosed as being useful for only closing a valve.

In many installations, it is desirable that the valve not fail shut but rather fail open or fail in an "as was" position, by the latter meaning that the valve is to be automatically actuated so as to return to a condition to which the valve previously has been set, e.g., a partially open or partially closed position.

Another deficiency of valve actuators of the prior art is that they are not amenable to the use of fusible links of various different types, such as electrically actuated as well as fire-sensitive fusible links.

An important object of the invention is the provision of an improved automatic actuator for rotary valves, and particularly the provision of such a valve actuator which provides automatic actuation of a valve without interfering with normal operation of the valve.

A further object of the invention is the provision of such a valve actuator which is of a compact nature and is adapted for being secured to a conventional rotary valve, such as a quarter-turn ball, butterfly or plug valve, for automatic actuation thereof.

A further object of the invention is the provision of such an automatic valve actuator which incorporates an actuating spring but wherein the actuating spring and other important elements are enclosed to protect them from the elements.

Yet another object of the invention is the provision of a valve actuator permitting normal manual or remote service operation of a valve, and although utilizing a thermal link which permits such operation without voiding normal fusible link warranties.

A still further object of the invention is the provision of such a valve actuator which is optionally configurable for providing fail closed, fail open, or fail "as was" modes of operation in response to an exigent occurrence.

An important further object of the invention is the provision of such a valve actuator which will provide valve actuation in response to occurrences such as heat, fire, or electrical signals from a remote location or from a smoke or other detector device.

Among still further objects of the invention may be noted the provision of such valve actuator which may be utilized in connection for valves with sprinkler systems to provide fire protection, which can be utilized to comply with occupational safety and health requirements, to prevent environmental damage, for example, in conjunction with petroleum and gas platform rigs, and which can be utilized to shut off or to maintain the operation of fluid systems in various industrial applications.

Another object of the invention is the provision of such a valve actuator of the type utilizing a fusible link but which, upon separation of the fusible link during fail safe operation precludes the fusible link elements from being thrown from the actuator as dangerous projectiles.

Among additional objects of the invention may be noted the provision of such a valve actuator which is extremely simple, low cost and of configuration having relatively few parts and facilitating low cost and simple manufacture; and which is durable, long lasting and extremely reliable in operation.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 7:
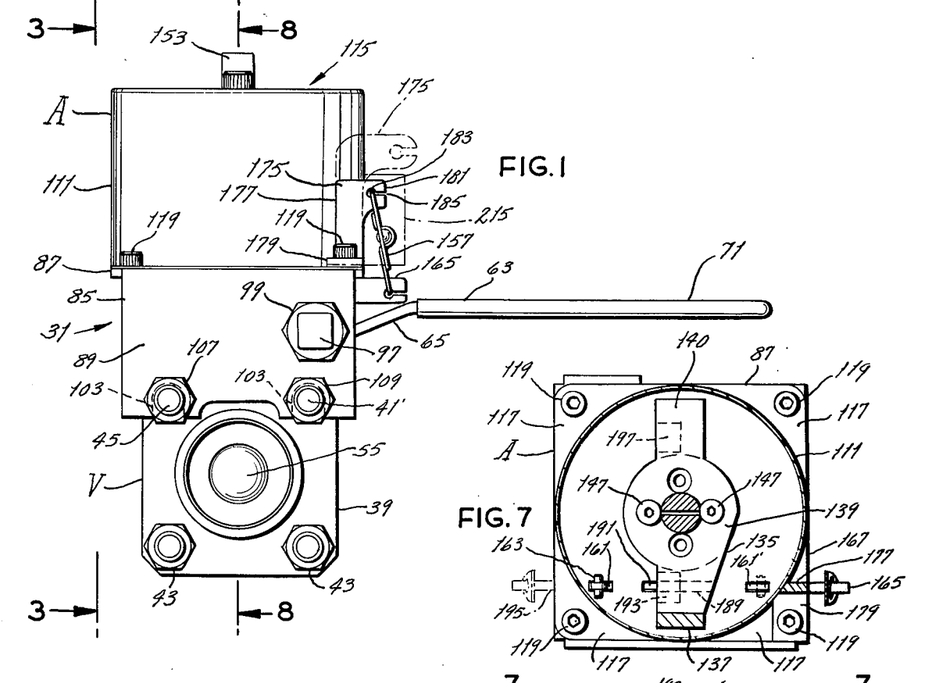
FIG. 1 is an end elevation of first embodiment of a new valve actuator of the invention being shown attached to a quarter-turn ball valve.
FIG. 7 is a horizontal cross section of the new valve actuator, taken along line 7—7 of FIG. 6.

Referring now to FIGS. 1–12, and particularly to FIG. 1, a first preferred embodiment of a valve actuator of the invention is designated at A. Valve actuator A is shown secured to a rotary-actuated valve V of a known type to provide a unitary valve and actuator assembly which is designated generally 31.

Valve V is shown for purposes of illustration only as being of a quarter-turn ball type valve. However, it could instead be one of various other rotary-operated valves such as butterfly or plug valves. Actuator A is particularly well-suited for use with valves which are actuated by rotation of a shaft through a quarter turn (90°) for reasons developed more fully below, although the principles of the invention are applicable to valves which are actuatable by shaft rotation of a greater extent.

Referring to FIGS. 1–4, valve V comprises a body 33 constituted by a center section 35 of generally cylindrical cross section, clamped between two generally rectangular end sections of a flanged nature 37 and 39. Said end flanges 37, 39 are clamped tightly to center section 35 of the valve by bolts 41 including a bolt 41' which is slightly longer, which extend horizontally lengthwise through the valve assembly and are secured by nuts 43 on bolts 41 and a nut 43' on bolt 41'. Three such bolts 41 are indicated. Ordinarily, valve V would include a fourth bolt oriented and secured by a nut in the same manner as the remaining bolts, but such bolt has, for the purposes of mounting actuator A to valve V, been replaced by a stud 45 of greater length than bolts 41.

Said stud carries bolts 47, 49 at opposite ends thereof adjacent flanges 37 and 33 for compressing the flanges against center section 35 in the same way as would be accomplished by a bolt, thereby not interfering with the normal construction of the valve in any substantial respect. Such arrangement merely serves as an expedient for the securing of valve actuator A to valve V in the preferred manner, it being understood that actuator A would be secured to valve V by other expedients, including merely using the valves already in existence on the valve structure, presuming their length to be of sufficient for mounting purposes, as will be appreciated.

Each of the flanged end sections 37, 39 has a respective collar 51, 53 extending outwardly thereof. Each such collar has a cylindrical outer surface and is internally threaded in suitable manner for connection of pipe or other fluid conduit thereto. As will be understood, one of collars 51, 53 provides an inlet to the valve and the other an outlet. Said inlet and outlet are connected by an axial passage through center section 35 of the valve. Located in such passage is a valve element which, as illustrated, is a ball type element as designated at 55. Said ball element 55 has a spherical outer surface 57 and a bore 59 of substantially constant diameter extending transversely through the element (see FIG. 8).

Valve element 55 is journaled for rotation in center section 35 of the valve, there being a shaft 61 extending from element 59 vertically through valve center section 35 for providing rotation of valve element 55 on a vertical axis. With rotation of shaft 61, valve element 55 is rotated to provide for alignment of the axis of bore 59 either transverse to the valve assembly, or in line with the inlet and outlet openings provided by collars 51 and 53. Thus, in FIG. 1, element 55 is shown in a closed position, the bore 59 of member 55 being transverse to the passage between the inlet and outlet. Such orientation is shown in phantom lines in FIG. 3. Element 55 may be surrounded by appropriate glands or seals, etc. (not shown).

Upon rotation of shaft 61, valve element 55 may be rotated through a predetermined angular extent for moving the valve between open and shut positions (such requiring 90° of rotation), or any lesser amount for modulating the flow through the valve.

Secured to actuating shaft 61 of valve V is a conventional operating handle 63 (FIGS. 1 and 2) constituted by a relatively thin elongated bar 65 having one end 67 connected to shaft 61 and having a shaft remote end 69 having a grip 71 thereon. Securement of said end 67 of the operating handle is provided by a conventional arrangement including a nut 73 threaded on an extension of shaft 61, the shaft end portion 67 of the operating handle being keyed or otherwise complementarily mated to prevent turning of handle portion 67 relative to shaft 61. Said portion 67 is impinged between a collar 75 which is affixed (see FIG. 8) to an extension 77 of shaft 61 by means of a pin or set screw 79 extending through the collar 75 and shaft extension 77. Collar 75 is part of a coupling 81 having a flanged portion 83. Coupling 81 serves to couple actuator A to valve shaft 61. In the provision of valve V without an actuator, the shaft end portion of the valve actuating handle 63 is conventionally bolted or otherwise suitably secured to shaft 61 by appropriate means but such arrangement is altered for the purposes of connecting an actuator of the present invention to said valve by providing said shaft entension 77 and coupling 81. Hence, modification of an existing valve for the purposes of attachment of the present actuator A thereto is required to this extent.

Figure 3:
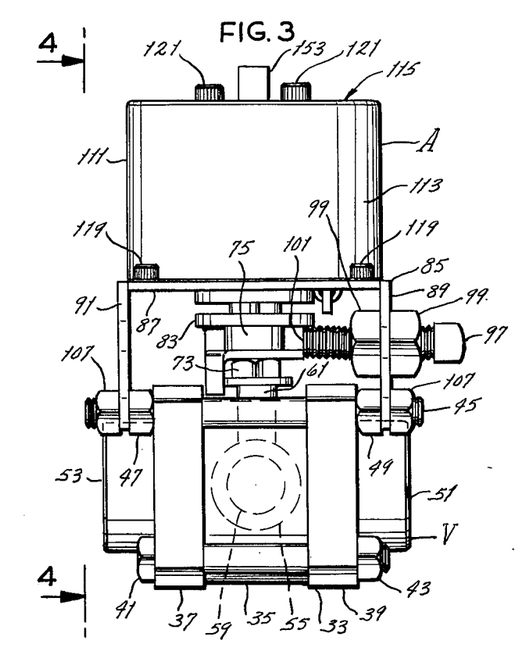
FIG. 3 is a side elevation of the actuator and valve assembly of FIG. 1.
Figure 4:
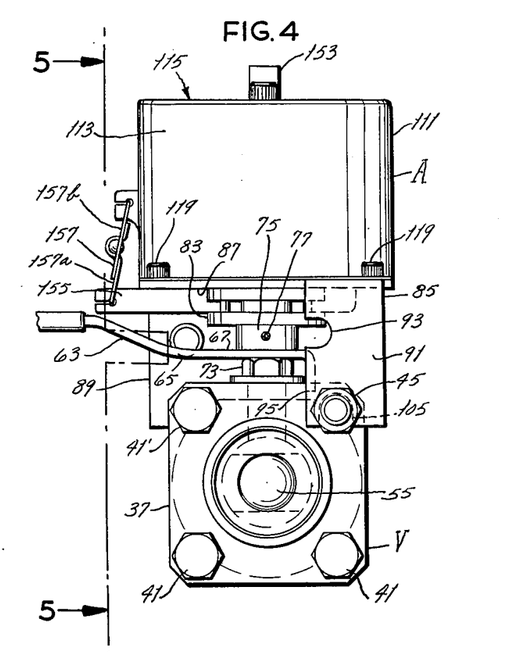
FIG. 4 is an opposite end elevation of the actuator and valve assembly, taken along line 4—4 of FIG. 3.

The actuator is affixed to the valve body by means of a bracket 85 which is of inverted channel shape in cross section, as best seen in FIG. 3. Said bracket 85 comprises a horizontal base plate 87 from which depend vertically legs or webs 89 and 91, each forming a right angle with plate 87. Said legs 89 and 91 are each of appropriately strong, stiff metal, such as carbon steel or stainless steel and preferably are formed integrally with plate 87, being bent downward therefrom, for example. Such stainless or carbon steel is also preferred for other structural elements of valve actuator A.

Leg 91 is of relatively narrow width (see FIG. 4) and is provided with a notch 93 at the level of valve actuator handle 63 along one edge 95 of the leg to provide clearance so that valve actuating handle 63 may be moved from the position shown, wherein it extends transversely to valve body 33, to a valve open position displaced 90° therefrom in which the handle is then in line with the passage between the valve inlet and outlet, i.e., is aligned with the valve body. The cross sections shown in FIGS. 10 and 11 indicate the width of legs 89 and 91 and illustrate movement of handle 63 from fully closed position (FIG. 10) to the fully open position (FIG. 11).

Figure 10:
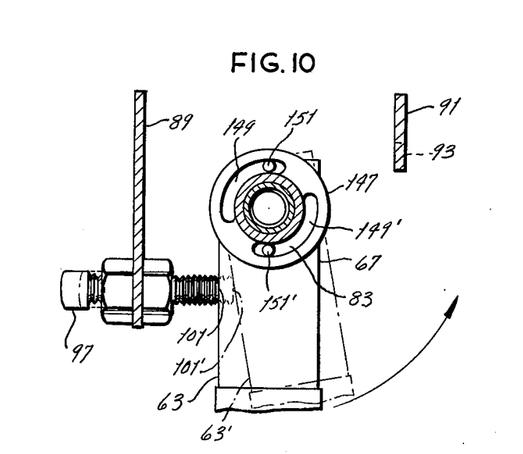
FIG. 10 is a vertical cross section of the actuator, illustrating portions of support structure thereof and an actuating handle of the valve, and taken along line 10—10 of FIG. 8.
Figure 11:
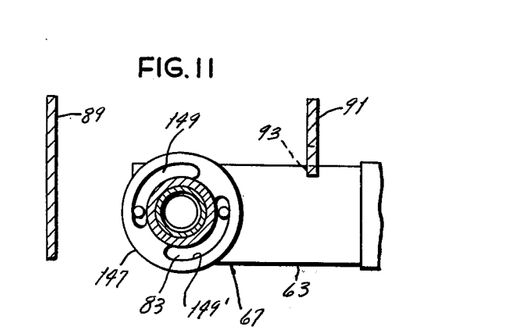
FIG. 11 is a vertical cross section similar to FIG. 10 but illustrating a valve handle of the valve in a different position, with portions of FIG. 10 being broken away for clarity.

Leg 91 extends substantially the entire width of the actuator as seen in FIG. 1 and in FIG. 10. Extending through leg 89 is a set screw or stop constituted by a bolt 95 which is fixed in position relative to leg 89 by a pair of jam nuts 97,99. Said stop is positioned to provide an abutment constituted by the end 101 of the screw for positively limiting movement of valve actuating handle 63 when said arm is in the position shown in the drawings. Said stop desirably prevents the actuating arm from being bent or otherwise damaged upon valve operating actuation by actuator A. Such actuation provides forceful, rapid movement of the actuating arm to the position shown when the actuator is configured as shown in the drawings which might otherwise damage the valve operating handle.

As will be explained below, the actuator can be configured for causing the valve to be turned to a fully open position, if desired, rather than the configuration presently shown. In such case, an additional stop of like nature may be employed.

Figure 5:
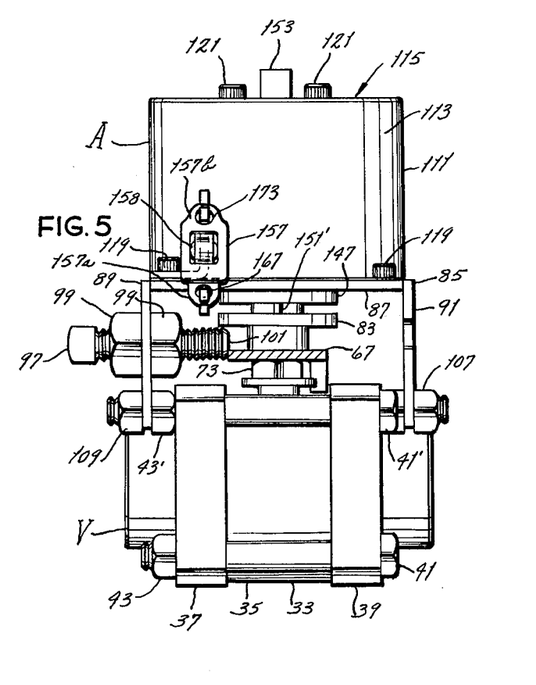
FIG. 5 is an opposite side elevation of the actuator and valve assembly, partially broken away, and taken along line 5—5 of FIG. 4.

Bracket legs 89 and 91 are notched at their lower margins. Such notches are shown at 103 in FIG. 1 by dashed lines. The notches 103 are spaced with respect to the lower edge of leg 89 to align with bolt 41' and stud 45. Similarly, leg 91 is provided with a notch 105 for alignment with stud 45. Additional nuts 107 are then applied to opposite ends of stud 45, and an additional nut 109 secured to the end of bolt 41', as seen in FIG. 5, thereby securing the bracket legs 89, 91 to the valve body.

The relative length and spacing between legs 89 and 91 are matters of choice dependent upon the dimensions of the valve to which an actuator A of the present invention is to be secured. As will be understood, such valves may vary greatly in size with the requisite dimensions of the bracket being desirably accommodative of the valve body for rigid securement thereto. For example, an actuator A as presently shown and described is useful for valves ranging in size from ¼ inch (6.4 mm) to 2 inches (50.8 mm). Such sizes indicate the conventional dimensions of conduit to which the valve is connected. However, the invention is not be be construed as limited for use with valves within such range of sizes.

Figures 2, 6:
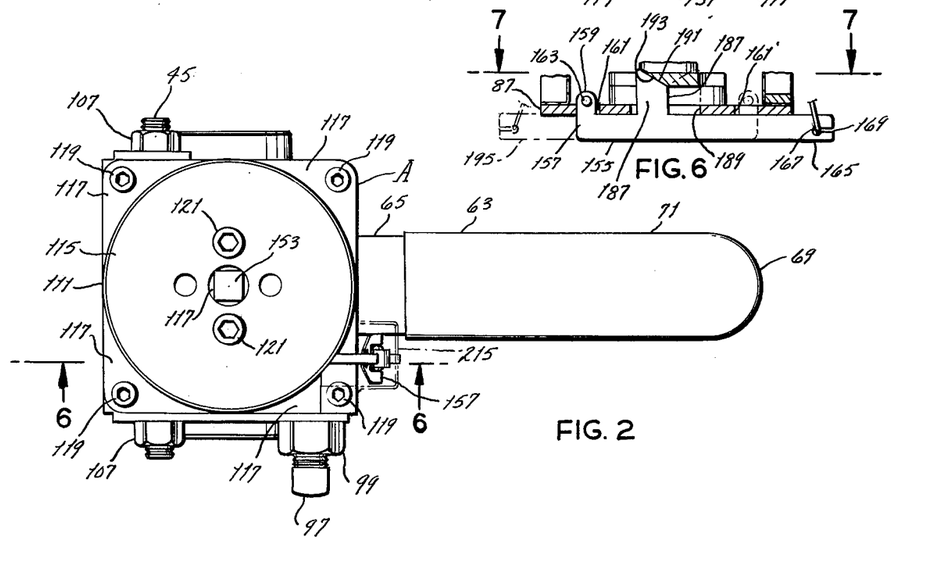
FIG. 2 is a top elevation of the actuator and valve assembly of FIG. 1.
FIG. 6 is a fragmentary cross section of camming mechanism of the new valve actuator, partially broken away, and taken along line 6—6 of FIG. 2.

Mounted upon plate 87 is an enclosure or cover 111 having a side wall 113 configured in the shape of a right cylinder and closed by a surface 115 at the top. Extending from side wall 115 at the lower part of the enclosure are flanges 117 of the cover, as depicted in FIGS. 2 and 7. The flanges are secured by screws 119 threaded into base plate 87 so as to affix the cover to support bracket 85.

Positioned on the interior of cover 111 is a spring coupling or securement element 117. Said element 117 has a flanged portion 120 secured by screws 121 to the top 115 of the enclosure. Extending downwardly from said flange portion and concentric with the enclosure and coaxial with shaft 61 of the valve is a cylindrical body portion 123 which is bisected by a transverse slot 125 cut therethrough (see FIG. 8). Said slot is dimensioned for receiving one end 127 of a spiral torsion spring 129 of suitable tempered spring steel for securement of one end of said spring relative to the housing. Said spring has a plurality of coils of strip form wound about the longitudinal axis of securement member 117. The spring terminates in an opposite end 131 folded outwardly upon itself to create a bight 133 for applying the torsioned force of said spring, when tightened, to a spring support arm 135 having an upstanding portion 137 received within said bight so that said arm is L-shaped. Arm 135 has a central portion 139 extending transversely across the major part of the distance between the inner surfaces of cover side walls 113, there being a transverse portion 140 of arm 139 remote from upstanding portions 137. Said main portion 139 is journaled for rotation about a reduced diameter lower extremity 141 of spring coupling element 117.

Figure 8:
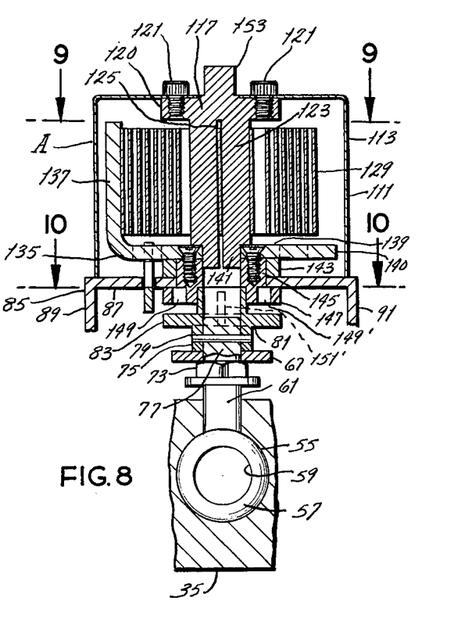
FIG. 8 is a vertical cross section of the new valve actuator, taken along line 8—8 of FIG. 1, and illustrating also portions of the valve to which the valve actuator is shown in FIG. 1 to be attached.

The central portion 139 of support element 135 is of substantially circular shape in plan, and is spaced from plate 87 by an annular spacer 143. Secured to the central portion 139 of support element 135 is a concentric sleeve 145 which is secured by screws as indicated at 147 in FIG. 7 to central portion 139 and extends downwardly therefrom. Said sleeve 145 is integral with a flange 147 of greater diameter which abuts the lower surface of plate 87. As FIG. 8 illustrates, the spacing between the lower side of central portion 139 of arm 135 and the lower side of plate 87 is approximately equal to the thickness of the annular spacer 143 and the length of sleeve 145 so that, as a unit, arm 135 and sleeve coupling 145 are rotatably journaled in plate 87, being rotatable about the reduced diameter lower extremity portion 141 of spring coupling 117.

Figure 12:
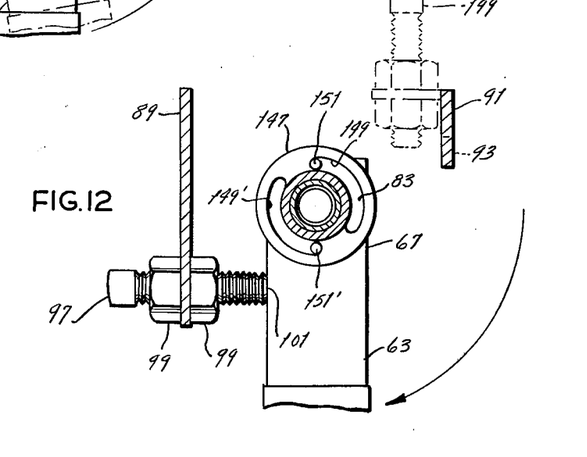
FIG. 12 is a vertical cross section similar to FIG. 10, but illustrating return of the valve operating handle to the position illustrated in FIG. 10 in response to the operation of the new valve actuator.

Referring to FIGS. 10-12, coupling flange 147 is provided with arcuate slots 149, 149', each extending slightly more than 90° in arcuate extent. Extending up into slots 149, 149' are respective pins 151, 151' carried by flange 83 of lower coupling 81. This structure provides a lost motion coupling for coupling the force of the spring 129 to valve shaft 61, upon operation of the actuator, but permits normal operation of the valve by movement of handle 63 without interference by the actuator with such movement and without causing said spring 129 to exert any additional force on shaft 61.

As will be apparent, the inner end of spring 129 is secured against rotation relative to cover 113 by the securement of spring coupling member 117 to the cover top 115. Screws 121 maintain flange 120 fast to the top in a desired position. For purposes of tensioning the spring, an extension 153 of coupling 117 is provided, extending upward through an aperture in the top 115 of the cover, the shape of the extension being square (FIG. 2) so that a wrench may be applied to extension 153 for providing a predetermined degree of tightening of the spring. Screws 121 are inserted when a desired degree of tightening has been attained.

Figure 9:
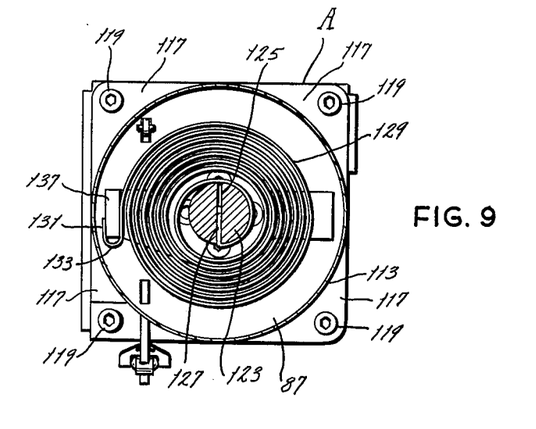
FIG. 9 is a horizontal cross section of the valve actuator, taken along 9—9 of FIG. 8.

The other end of spring 129, by means of bight 133 turned around support arm extension 137, applies the force of the spring tending to cause clockwise movement of spring arm 135 as viewed in FIGS. 7 and 9. Such clockwise rotation is in the direction for closing valve V. Since coupling 147 is carried by the central portion 139 of spring arm 135, such coupling will be rotated to engage pins 151, 151' by means of slots 149, 149' of coupling 147.

However, such rotation of the coupling is normally prevented and may occur only when releasably permitted by a camming mechanism including a lever arm 155 (see FIGS. 4 and 6) having one end secured to plate 87 and the other end restrained by interengagement in the one end of a releasable link 157, the other end of the link secured relative to enclosure 111, the link thus being presented exteriorly of said enclosure. Said link is shown as being of a fusible type adapted for releasing in response to heat caused by an exigent occurence such as fire, or other manifestation of excess heat.

Fusible link 157 may be adapted for melting in response to heat ranging, for example, from 135° F. (57.2° C.), to 500° F. (260° C.). The fusible link is of a commercially available type comprising two portions 157a, 157b, which are normally joined and secured together by a fusible element 158 maintained in place between the periphery of an aperture in member 157b and a loop formed by a portion of link portion 157a. The portions of said links remote from said loop are each of a thin, flat material, each having an aperture as indicated for permitting tensile force to be applied to the link for causing separation thereof when said element 158 fuses in response to a predetermined temperature in the environment surrounding the link.

Lever arm 155 comprises a relatively thin strip lying in a vertical plane and extending beneath the surface of plate 87, as shown in FIG. 6. Said arm has one end 157 secured in pivotal relationship to plate 87 by means of an extension 159 which extends upward through a slot 161 within plate 87, said extension 159 being secured in place within said slot 161 by a pin 163 fitted transversely within an aperture in the extension. The other end 165 of arm 155 extends outwardly beyond one edge 167 of plate 87, and thus beyond the corresponding securement tab 117 of the housing. Said end is provided with an aperture 167 for engaging a corresponding aperture 169 of link 157. A narrow slot 169 opens outwardly, relative to the housing, from aperture 167 to provide a slotted opening for securely retaining the link, for reasons which are explained more fully below. The opposite end of link 157 is similarly provided with an aperture 173 (see FIG. 5) which is engaged by a link holder 175 comprising an upstanding portion 177 and a foot 179 forming an L-shaped configuration. The foot portion 179 is secured by one of the screws 119 to plate 87. Extending outwardly from upstanding portion 177 is a short extension 181 of the link support, said extension being provided with an aperture 183 opening outwardly by means of a slot 185 in the same manner as the pivot remote end 165 of arm 155.

Arm 155 exerts a camming action for preventing rotation of spring arm 135 responsive to the spring forces present when spring 129 is tightened and secured as indicated. For this purpose, arm 155 has a portion 187 extending upwardly through a slot 189 of plate 87, said extension having a beveled surface 191 providing a cam face for engaging a corresponding face constituted by a bevel area 193 of spring arm 135. As will be apparent, a force of spring 129 tending to cause clockwise rotation of spring arm 135 will cause a camming force to be exerted downwardly upon extension 187 for tending to separate link portions 157a, 157b.

It will be understood that if the link securements were of a more simple nature simply providing notched engagement of but a portion of the apertures of the link elements, separation of the link upon fusible operation thereof would permit the link parts to separate from one another with a relatively high speed resulting from the camming force exerted by spring arm 139 against the lever arm. Such would produce substantial acceleration of the link portions causing them in all probability to fly from the actuator A with high speed so as to become, in effect, projectiles which could conceivably injure bystanders. In order to preclude the link members from being thrown as projectiles, the slotted aperture arrangement securely retains the elements in position, where they may be later removed when the actuator is reset and a new fusible link installed.

It will be noted that plate 87 is provided with a further aperture 161' corresponding in dimensions and spaced relative to aperture 161 symmetrically about the axis of rotation of spring arm 135 so as to provide a location for securement of portion 157 of the link-restrained lever arm 155 with said lever arm in reversed position as represented in phantom and designated at 195 in FIGS. 6 and 7. In addition, slot 189 in plate 87 is of relatively longer length than the corresponding dimension of extension 187 of the lever arm. Slot 189 will accommodate portion 187 when said lever arm is in a reversed position. When configured in the reversed position represented by phantom lines, lever arm 155 has its camming surface 191 in a position which is reversed relative to that shown in FIGS. 6 and 7, said camming surface 191 then presented for being contacted by a corresponding camming surface provided by a beveled area 197 on the underside of the rearward extension 140 of spring arm 135. Hence, when the lever arm occupies this reversed position, the camming arrangement is such as to preclude rotation of spring arm 135 in a counter-clockwise direction. Arm 135 may be biased for movement in a counter-clockwise position by reversing the orientation of spring 129 by simply turning the spring upside down. When so reversed, bight 133 is oriented in the opposite direction from that shown for biasing arm portion 137 in the direction opposite from that illustrated in FIG. 9.

Accordingly, valve actuator A may be configured, utilizing essentially the same parts, for providing actuation of the valve in a direction reversed from that illustrated. It will be understood, of course, that link securement 175 is replaced by a corresponding link securement adjacent the remote end 165 of lever arm 155 and is maintained in place, substantially in the manner illustrated in the drawings, by one of screws 119. When the valve actuator is configured for such counter-clockwise actuation of the valve, it may be desirable to provide a stop corresponding to that illustrated at 97, but located adjacent bracket leg 91 so as to limit movement of valve actuation handle 63 upon automatic actuation by the valve actuator. Said stop may be in the same adjustable length screw as illustrated for stop 97, but secured by an appropriate bracket held in place by bolting, for example, to stud 45 or to bracket leg 91.

In operation, valve actuator as illustrated in the drawings is secured to valve V in the manner explained, it being understood, of course, that coupling 75 is appropriately attached to valve shaft 61 as for example, by replacing the conventional bolt which maintains the valve actuating handle 63 in place by a threaded stud or the like which is threaded into the portion of shaft 61 which would ordinarily receive the bolt or other securement for handle 63. Said coupling 75 is then secured by insertion of pin 77. Link 157 is installed by inserting the link into slot 169, and then rotating it upward to the position illustrated. Similarly, slot 185 is fitted over the other end of the fusible link, and the link securement 175 then fastened in place by the use of screw 119 as indicated, Spring 129 may then be tensioned as desired, by first removing screws 121, applying a wrench to the head 153 of the upper spring support member 117, and replacing the screws 121 at a desired tension.

The valve actuator as thus configured is ready for automatic actuation of a vlave. Because of the lost motion coupling provided by coupling member 75, pins 151, 151' carried thereby and the corresponding slot 149, 149' of coupling flange 147 valve actuator A does not interfere with the normal operation of valve V produced by swinging the actuating arm 63 in the position shown from FIG. 10 to that shown in FIG. 11. As these two figures illustrate, pins 151, 151' are free to move within slots 149, 149' respectively without causing spring force of 129 to be applied to handle 63. As will, therefore, be appreciated, a valve V provided with a valve actuator A of the embodiment can be utilized in a conventional fashion, with the valve operating handle being movable at all times between its off position illustrated in the drawings to that in which it is fully on as shown in FIG. 11, as well as all positions of an intermediate nature for modulating flow through the valve.

However, upon the presence of heat sufficient to operate fusible link 157, link 157 will separate, as explained more fully below, to permit link secured end 165 of arm 155 to move to a position, by pivoting action upon pin 163 thereof, to a position permitting spring arm 135 to travel unencumbered in a clockwise direction. When this occurs, the spring force provided by spring 129 is coupled via the terminal portions of slots 149, 149' to the corresponding pins 151, 151' which are normally otherwise movable within the slots. Such driving force then produces clockwise movement of the valve for causing valve arm 63 to be rotated to the valve closed position shown in the drawings. Such operation is illustrated in FIG. 12, wherein it is seen that coupling member 147 has been turned in a clockwise direction from that illustrated in FIG. 11 for producing such valve closing action. Such operation may be termed a "fail closed" mode of operation since the valve is affectively closed or shut by automatic operation to preclude flow of fluid therethrough.

The valve actuator is, as noted above, amenable to being utilized for causing automatic movement of the valve shaft in a counterclockwise direction by simply re-orienting lever arm 155 to the position shown in phantom at 195 in FIGS. 6 and 7, the link being then secured adjacent the distal end 165 of the lever arm. Under such circumstances, spring arm 135 is ordinarily prevented from rotation by engagement of cam face 197 against the inclined edge or surface 191 of the lever arm.

When the fusible link 157 releases, lever arm 155 will pivot to a position permitting unencumbered counter-clockwise rotation of spring arm 135. The lost motion coupling arrangement previously described then causes the spring force to be coupled to the valve actuating shaft 61 but for producing counter-clockwise rotation thereof. Because of the abrupt and forceful rotation in a counter-clockwise direction, the advantage of utilizing a stop of the nature shown at 97 engaging handle 63 of the valve is to be appreciated. The installation of such a stop is representatively indicated in phantom at 199 in FIG. 12 but is otherwise not shown in the drawings in the interest of clarity and simplification of the drawings.

Such latter counter-clockwise actuation to produce closing action of the valve may be noted as providing a "fail open" mode of operation in that the valve is automatically place in an open condition upon operation of the actuator.

It is important to observe that even upon actuation valve handle 63 may be manually returned to an open, or closed, position as the case may be, against the force of spring 129 if it is desirable to effect operation of the valve after fusible link 157 has released. Such operation may, for example, be desirable wherein an emergency condition has occurred but where a return to normal operation is requisite. Of course, the actuator may readily be reset by replacing fusible link 157 and causing spring 129 to be again tensioned in the manner previously described.

Although the present actuator may provide both "fail closed" and "fail open" modes of operation, the new actuator may also provide what is termed a "fail as was" mode of operation. In this regard, it will be understood that a valve may be desirably operated with only a partially opened position. Thus, for example, in a petroleum refinery, it may be advantageous to maintain, at all times, a predetermined degree of flow through the valve even in the event of an exigency such as fire. For this purpose, valve handle 63 may be positioned to provide such partial flow. The adjustable stop 197 may then be repositioned to orient the end 101 of said stop to a location limiting the movement of valve 63. For example, such position may be nearly closed. Nuts 99 are then secured to fix the location of stop end 101 so as to preclude movement of valve actuating handle 63 to a position more closed than determined by the position of the stop. Such a position of handle 63 is shown by dashed lines in FIG. 12, where the valve actuating handle in such movement limited position is designated at 63', the adjusted relocation of the end of stop 97 being shown at 101'. It will be understood, of course, that movement of handle 63 may be also limited to a position which is less than fully open by a stop such as that designated at 199 in FIG. 12.

Figure 22:
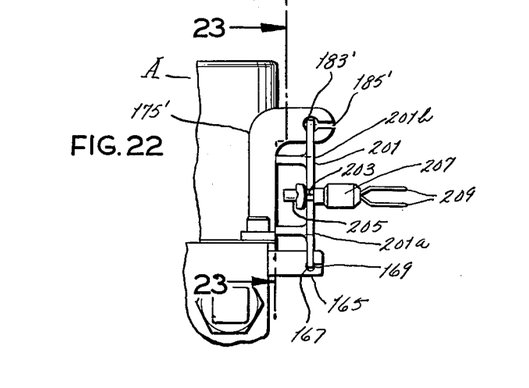
FIG. 22 is a fragmented end elevation of portions of a valve actuator of the first embodiment but illustrating an alternative fusible link which may be employed with the new actuator.
Figure 23:
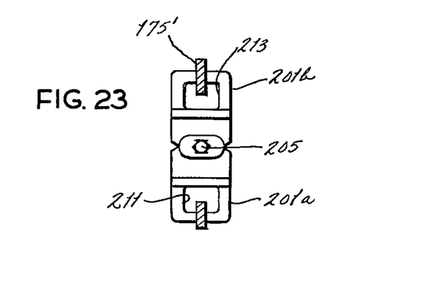
FIG. 23 is a fragmentary vertical cross section, taken along line 23—23 of FIG. 22 and illustrating features of the alternative fusible link of FIG. 22.

A valve actuator A of the present invention is not limited for use with a heat-sensitive fusible link 157 as illustrated. Alternatively, the link may be of a type which is thermally sensitive and has actuating means associated with the link for generating the heat for actuation thereof in response to an exigent occurrence remote from the link. FIGS. 22 and 23 illustrate the equippage of an actuator A of the present invention with an electrothermal link 201 of a type having link members 201a and 201b joined together at 203, there being a means comprising a tubular extension or fitting 205 extending between portions 201a and 201b and having an actuating element 207 carried at one end of said extension 205, said element 207 receiving electrical current via leads 209 for causing link portions 201a, 201b to be separated at their joint 203 upon expansion of tubular fitting 205. Such electrothermal link is preferably of a commercially available nature known as a frangible type link. The electrothermal link will operate upon a current supplied thereto which typically may be about an ampere at 6–30 v.a.c. or d.c. for a brief interval such as 10 m sec. However, it can also be actuated by excessive heat exterior of the cover and adjacent the link, such as caused by a fire.

For purposes of securing said electrothermal link to said actuator A, it is preferred to utilize a link securement 181' of somewhat greater height than that shown at 181 in FIGS. 1–12. Said longer link extension 175' is shown in phantom in FIG. 1. Link portions 201a 201b which are remote from joint 203 are of relatively thin, flat stock, each having an appropriate aperture 211, 213 for applying tension to the link. The periphery of aperture 169 is received by the corresponding aperture 167 in the remote end 165 of lever arm 155. For this purpose, link 201 is inserted through slot 169 of the lever arm and then rotated to the position shown in FIG. 22. In corresponding fashion, link securement 175' has an aperture 183' for engaging the periphery of aperture 213 of link portion 201b, there being a slot 185' opening outward from said aperture 183' for permitting the link securement and link to be interengaged.

The frangible electrothermal link 201 is, like fusible link 157, securely maintained in place upon the actuator by the slotted aperture arrangement, preventing the link elements from being thrown as projectiles from the actuator upon separation of the elements.

In some installations in which personnel may be in close quarters with valve V and the actuator A secured thereto, it may be desirable to use a link of the type shown in conjunction with FIGS. 1–12 or frangible electrothermal type link shown in conjunction with FIGS. 22–23 so as to preclude personnel from bumping into or otherwise causing damage to the link. For this purpose, an appropriate shield of thin metallic construction may be employed. Such a shield is illustrated in phantom at 215 in FIGS. 1 and 2. A shield of this type may be fabricated of thin stock, bent or otherwise formed to provide an appropriate guard for the link. Such shield 215 may simply be secured by having a portion thereof retained under the most adjacent screw 119 which holds cover 111 to plate 87 of the support bracket. Said shield 215 may be in various forms, and it is well within the province of those skilled in the art to configure the shield as requisite if such a shield is employed. However, notwithstanding the use of a shield, the link is located exteriorly of cover 111 so as to be accessible for replacement purposes and also for responding to heat exteriorly of the cover, or other exigency.

A valve actuator employing an electrothermal link is shown in FIGS. 22 and 23 may be used for causing actuation of the valve by the actuator in response to various remotely sensed conditions, such as smoke, heat, various emergency conditions, or any other condition of an exigent character requiring automatic operation of the valve. For example, the valve actuator may be located on a valve exteriorly of a building but with the valve actuator element 207 having its leads 209 connected to a smoke detector, for example, on the inside of a building. Accordingly, if a fire should occur within the building, as for example, at a chemicals processing plant, a valve will be actuated to automatically close in response to fire occurring within the building.

Other applications are readily envisioned making use of electrothermal link 201. For example, a valve V may be interconnected with the water supply line and configured in a normally closed position with the actuator configured for causing automatic opening of the valve in response to releasing of the link. Leads 209 of the link may then be connected to a smoke detector within zones of a building to be protected. Upon detection of smoke, a signal of sufficient magnitude will cause element 207 to separate link elements 201a, 201b for causing automatic opening of the valve to admit water to a sprinkler system within the building.

Additionally, a valve actuator of the invention may be utilized with a valve for controlling the flow of air or other gas to a pneumatic actuator for large valves of the type used for ducting gases or fumes, e.g. large butterfly valves. A typical further use may include the use of a valve actuator with a valve for supplying gas to a pneumatic actuator for blocking air supply to a spring return valve actuator of the type for maintaining the positioning of a valve element in a larger valve than that controlled by a valve actuator in the invention.

Referring now to FIGS. 13–21, a further embodiment of a valve actuator of the invention is designated B, said actuator being connected, in the manner previously described with respect to valve actuator A to a valve V such as a quarter-turn ball valve of the type previously described. To simplify the drawings and in the sake of clarity, the structure of a valve utilized with actuator B is not shown. However, it will be understood by those skilled in the art that interconnection with a valve V and mounting of support bracketry of valve actuator B is effected in a manner substantially identical with that disclosed in connection with the first embodiment.

Said valve actuator B comprises a support bracket 217 having a horizontal plate 219 forming a base of actuator. Integral with and extending vertically downward from the front edge of said base plate 219 is an integral attachment leg or flange 221 forming a right angle with plate 219 and of generally rectangular configuration having a pair of notches 223 opening downwardly in the lower edge 225 of said flange. The centers of said notches are spaced apart by a desired dimension for engaging bolts of a valve such as bolts of the type designated 41 of valve V to which said actuator B is to be attached. The spacing between the notch centers, as well as the height of flange 221 are, therefore, chosen in accordance with the type and dimensions of the valve to which the actuator is to be attached. The bracket and other structural elements of actuator B, as with actuator A, are preferably of stainless or carbon steel.

Said bracket 217 also has upturned integrally-formed flanges 227, 227' at opposite sides of base plate 219, said flanges being turned inwardly toward each other to provide upper flange surfaces 229, 229' so as to shield at each side of the actuator for a purpose explained below.

Positioned centrally on base plate 219 is a one-piece housing or enclosure 231 of right cylindrical configuration having a substantially vertical side wall 233 and closed at the upper end by a flat top 235. Extending outwardly from the side wall are four flanges 237 at the lower end. These are secured to base plate 219 by screws 239 threaded in plate 219.

Figures 17, 18, 19, 20, 21:
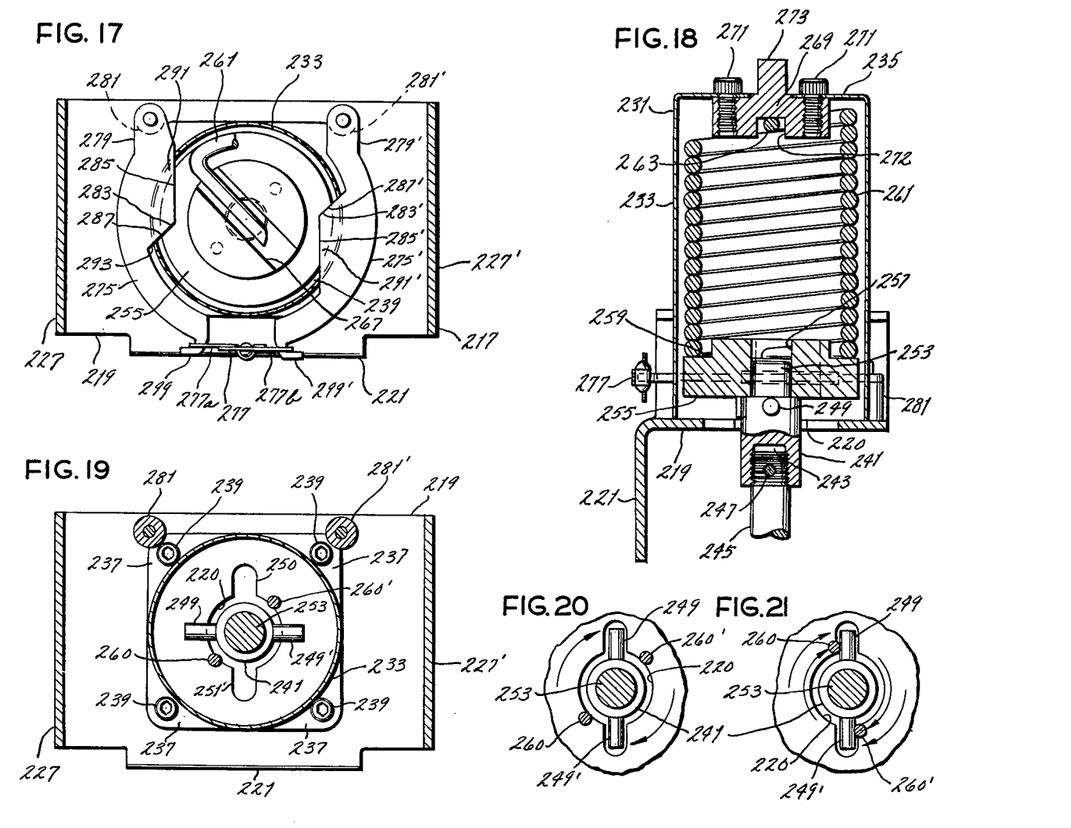
FIG. 17 is a horizontal cross section, taken along line 17—17 of FIG. 13, illustrating camming mechanism of the valve actuator at the second embodiment.
FIG. 18 is a vertical cross section, taken along line 18—18 of FIG. 13, depicting the attachment of the valve actuator to the actuating shaft of the ball valve of FIG. 13.
FIG. 19 is a horizontal cross section taken along line 19—19 of FIG. 13, and illustrating mechanism of the actuator for coupling of rotational force from the actuator to the ball valve.
FIG. 20 is a fragmentary cross section, similar to FIG. 19, and illustrating a rotation of the valve actuating shaft.
FIG. 21 is a fragmentary cross section similar to FIG. 20 but illustrating rotational movement of the coupling mechanism depicted in FIG. 19 for actuating the valve.

Extending downward from base plate 219 through an aperture 220 therein and concentric with housing 231 is a valve shaft coupling 241 of cylindrical shape having an axial bore 243 opening centrally downward therefrom and threaded as indicated in FIG. 18 for receiving the operating shaft 245 of the valve (which is, of course, not shown) to which actuator B is secured. Coupling 241 is also secured to valve shaft 245 by set screws or by a pin 247 extending transversely through coupling 241.

Referring to FIGS. 18 and 19, extending radially outwardly at opposite sides of coupling 241 at a location above base plate 219 are a pair of projections 249, 249'. The latter may be constituted by a single pin of cylindrical form extending through the coupling with its axis intersecting the coupling's longitudinal axis. For facilitating assembly of the actuator, aperture 220 is preferably provided with opposed notches 251, 251' of sufficient dimension for projections 249, 249' to pass through them.

The upper end of coupling 241 is provided with a length 253 of reduced diameter about which is journalled for rotation a spring support coupling 255 having an axial bore 257 closely fitted to the reduced diameter portion 253. Except for notches provided in coupling 255, the latter is generally of circular shape in plan, as viewed in FIG. 17. A pair of radially oppositely disposed pins 260, 260' are provided in the lower surface which extend vertically downward from the coupling and spaced radially outward for being engageable with projections 249, 249'.

The upper surface of coupling 255 is provided with a circumferential L-shaped seat 259. Supported in said seat is the lower end of a coiled torsion spring 261 having coils of circular cross-section, said spring being wound in cylindrical form with the axis of cylindricity coaxial with the axis of couplings 241 and 255. The top and bottom coils are each bent radially inward to provide upper and lower tangs 263, 265 for providing application of torsional forces of the spring to spring support coupling 255.

A channel 267 of substantially constant width is provided medially across the upper surface of coupling 255 and having a depth at the level of seat 259, for receiving the lower tang 265 of the spring.

An upper spring securement member 269 is held by screws 271 to the top 235 of the cover. Member 269 is of generally cylindrical shape as manifested by FIG. 18 but its bottom surface is provided medially with a channel 272 of dimensions approximately the same as channel 257. The upper tang 263 of the spring is received within channel 272.

A projection 273 of member 269 extends up through an aperture in the top 235 of the cover, having a squared shape (like projection 153 of valve actuator A) to permit application of a wrench for tensioning the spring.

Upon tensioning of spring 261 in this manner, rotation of coupling 255 is prevented by a camming arrangement comprising a pair of cam lever arms 275, 275'. These are each pivoted at one end relative to base plate 219 and have opposite ends interengaged by a releasable link 277 so as to provide camming forces to coupling 255 for precluding its rotation unless link 277 releases. The link is shown as being of the fusible type previously described.

More specifically, arms 275, 275' are each of relatively thin, flat stock and have respective ends 279, 279' pinned to studs 281, 281', respectively, which are suitably affixed to base plate 219. Consequently, said arms 275, 275' are pivotally secured for movement relatively toward and away from coupling 255. The latter is provided with notches 283, 283' at opposite sides thereof for engagement by said arms 275, 275', respectively, the notches are each defined by a pair of flat, intersecting faces. Thus the notch 283 of arm 275 has faces 285 and 287, while notch 283' of the other arm has corresponding faces 285' and 287'.

Arms 275, 275' are each of generally arcuate form so as partly to encircle coupling 255. Cover 231 is provided with narrow apertures 289, 289' at opposite sides thereof, each extending along an arcuate segment of coupling 255 for permitting the inside edges of arms 275, 275' to bear against the sides of the coupling. The arms are each provided with a respective extended area 291, 291' of shape complementary to notches 283, 283', respectively. Accordingly, the extension of arm 275 has a straight edge 293 adapted to bear against coupling surface 287, thereby providing a camming surface bearing against said surface 287. Edge 293 intersects with a straight edge 295, the latter lying adjacent face 285. Arm 275 has corresponding intersecting edges 293', 295'.

The arm extensions 291, 291' thus are maintained within the respective notches 283, 283' as shown in FIG. 17 to prevent rotation of coupling 255 so long as link 277 remains intact. As will be understood, the force of spring 261 will tend to cause clockwise rotation of coupling 255. Accordingly, notch faces 287, 287' by camming action against arm edges 293, 293' tend to cause the arms each to swing outwardly, thus applying tension to the link.

Figure 13:
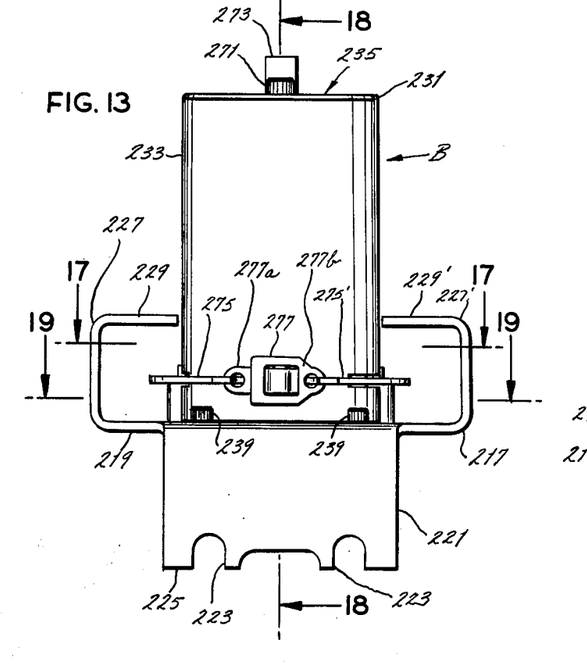
FIG. 13 is an end elevation of a second embodiment of a new valve actuator of the invention, the valve actuator being shown attached to a quarter-turn ball valve in the manner of FIG. 1.
Figure 14:
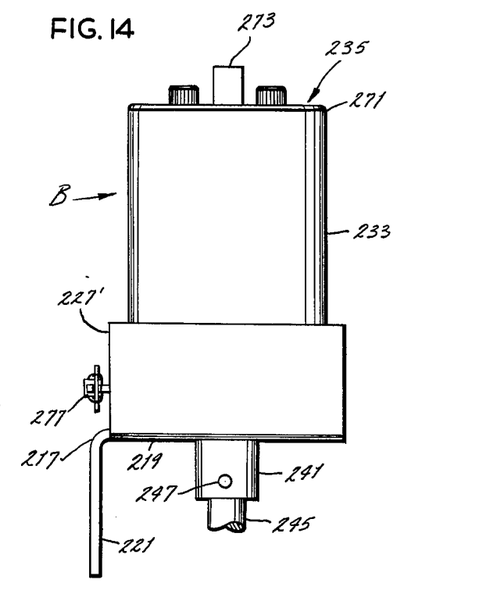
FIG. 14 is a side elevation of the actuator and valve assembly of FIG. 13.
Figure 15:
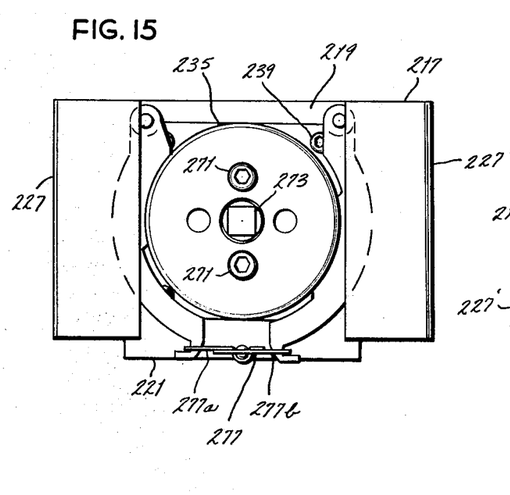
FIG. 15 is a top elevation of the actuator and valve assembly of FIG. 1.
Figure 16:
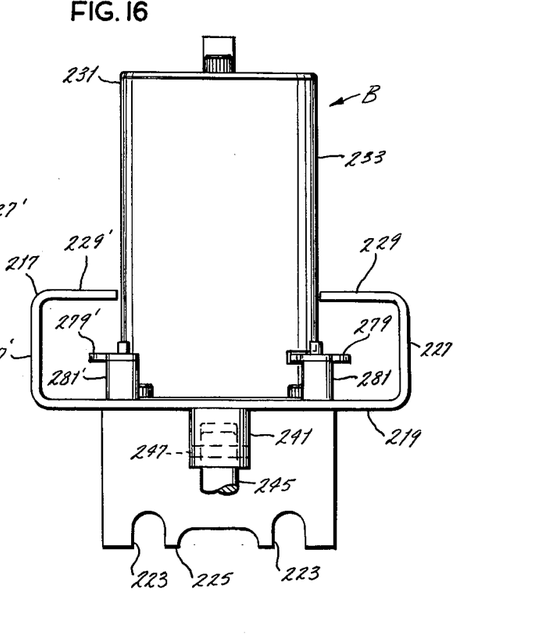
FIG. 16 is an opposite end elevation of the actuator and valve assembly of FIG. 1.

Referring to FIGS. 13, 14 and 15, link 277 is shown to comprise two portions 277a, 277b each having an end of relatively thin flat stock suitably apertured and further of configuration identical to link 157 shown with actuator A. The pivot remote ends 297, 297' of the arms have respective fingers 299, 299' for engaging the apertured link portions 277a, 277b, respectively.

Normally, then, coupling 255 remains stationary. However, the valve to which actuator B is secured may be operated in conventional fashion. The valve operating shaft 24 is free to be rotated between the open position, in which it is shown in FIGS. 18 and 19, to the closed position by turning the usual handle clockwise through a quarter turn, as was previously described relative to valve V. FIG. 20 indicates the resultant movement in a clockwise direction of lower coupling 241 as the valve shaft is moved through 90° of rotation from the open to the closed position.

However, actuator B is ready for automatically actuating the valve when spring 261 is appropriately tightened by turning head 273 and locking the upper spring securement member 269 and inserting the screws 271 as shown to lock member 269 in place, the link 277 and link arms 275, 275' having first been secured as shown.

In operation, it is now apparent that valve actuator B will provide automatic actuation of a valve upon occurrence of a condition of exigency such as fire or excessive heat causing fusing of link 277. Fusible links of this type are available commercially to provide such fusing action at a preselected temperature. When link portions 271a, 271b separate, arms 275, 275' will be forced radially outwardly with coupling 255 then free to rotate in clockwise direction.

FIG. 21 indicates the resultant clockwise movement of pins 260, 260' carried by coupling 255, which pins strike and drivingly rotate projections 249, 249', respectively, thereby automatically closing the valve. In this way, a "fail closed" mode of operation is provided by the actuator through its lost motion coupling arrangement.

However, by reversal of the arms 275, 275' and employment of a reversal orientation spring and a spring support coupling 255 having geometry reversed from that shown, counterclockwise actuation for providing a "fail open" mode of operation can be obtained. A "fail as was" mode may be obtained through incorporation of the principles described with regard to actuator A.

It is apparent that forceful movement outward of arms 275, 275' upon automatic actuation presents no hazard to personnel, since the upright flange portions 227, 227' prevent excessive movement of the arms outward from housing 231 and may also prevent injury which could occur if the separated link elements 277a, 277b were to be thrown from actuator, as otherwise might occur.

It is to be noted that an electrothermal link of the type shown in FIGS. 22 and 23 may be employed in place of the fusible link illustrated, in which case the distance between the link retention fingers 299, 299' of the actuator may be increased by appropriate arm design change to accommodate the longer electrothermal link.

In contrast with the prior art, the new apparatus of the invention provides a hitherto unsuggested and synergistic combination of features providing numerous commercial advantages and applications hitherto not achieved, in addition to attaining the various objects of the invention.

For example, the actuator is utilized to provide automatic closing operation of a valve, which valve is otherwise fully operable by manual actuation without the valve torque being increased or without voiding the fusible link warranty. Thus, such automatic fail-closed operation is useful to prevent pressure build-up of a system or component such as due to power failure to a main valve actuator because of fire or malfunction. The use of an electrothermal link in the actuator permits using the actuator to close a valve in the event of a link leak or rupture. The thermal link actuation permits use of the actuator also to prevent fueling of a fire, such as in petrochemical and other industrial chemical processing. As a further example, the fail closed operation may be utilized to prevent toxic gases or liquids from escaping because of a failure of system power normally powering a large pneumatic valve controller.

Among the several fail-open applications of the new actuator include using it to prevent pressure build-up of a pressure vessel or system, etc., because of fire; to prevent such pressure build-up due to power failure of an electrical or pneumatic power supply; to prevent failure of system pressure for a pilot-operated valve or actuator from causing pressure build-up; to permit venting of toxic gases or liquids in case of power failure; to permit flow of combustible or toxic materials to a flare used for safety purposes in the event of a power failure, fire or other emergency; to allow coolant in an emergency to circulate in a system or component such as a heat exchanger, e.g., of a nuclear reactor or in event of a cycling or power failure, etc.

Various other applications will become apparent to system designers cognizant of the advantages of the new actuator constructions. For example, use of the actuator will be seen to be ideal for remote or relatively inaccessible locations to protect against fire or respond to other exigencies. As a further illustration, the new actuator when utilizing an electrothermal link may be utilized in connection with toxic gas or smoke detectors to prevent fire, explosion, or toxic conditions from developing or becoming worsened.

A practical illustration of clear applicability of the new actuator is its use on vehicles, such as propane trucks, rail cars, and for shipboard use, as on gas and oil barges or tankers, etc. where a danger is presented by the possibility of collisions or other accidents such as train derailments.

In these and other uses, the actuator may be provided already installed by the original equipment manufacturer of valves or equipment utilizing the same. But the new actuators are also readily retrofitted to existing valve arrangements because of the ease of securement and facile installation made possible by the actuators.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

For example, the present valve actuator may be modified by the incorporation of a hexagon surfaced stem coupling to permit application of a wrench or the like to the coupling, in lieu of a handle, for actuation of the same. In addition, actuator B may be modified by extending flanges 227,227' forward with respect to link 277 to provide increased protection at the sides of the link for protecting the link and preventing the link elements from being drawn from the actuator upon separation.

What is claimed is:

1. A valve actuator for preselected automatic actuation of a rotary-actuated valve in response to an occurrence of specific exigent type, said valve having a body, a valve element rotatably movable in said body, an actuating shaft extending from said body and rotatable for rotating said valve element between first and second positions, said actuator comprising: shaft coupling means for coupling rotational force to said shaft for rotation thereof only when said coupling means is rotated, a coiled torsion spring for applying a spring force to said coupling means for biasing said coupling means for rotation, camming means for operatively preventing rotation of said coupling means responsive to said spring force when secured and for operatively permitting rotation thereof responsive to said spring force when released, an enclosure for surroundingly and protectively enclosing said coiled torsion spring and said camming means for protection from the elements, said spring having a plurality of coils wholly within said enclosure, a releasable link for securing said camming means against movement, said link being positioned exteriorly of said enclosure in a visible, replaceable position for permitting observation and replacement of said link without removal of said enclosure, said link releasing said camming means upon said exigent occurrence, said link comprising at least two portions normally joined and adapted to separate for releasing action of said link, securement means for retaining each of said link portions in attachment to said valve actuator upon separation to prevent said portions from being ballistically thrown from said valve actuator upon said separation but said securement means permitting facile manual installation and removal of said link, said link portions each having an apertured end, said actuator having a first and second link securement member for respectively securing said link by applying force via said apertures and for retaining said link members in a secured relationship upon separation thereof, and means for direct securement of said valve actuator to said valve body.

2. A valve actuator as set forth in claim 1 wherein said shaft coupling means provides lost arcuate motion coupling to said actuating shaft for causing rotation of said actuating shaft through a predetermined angular extent only when rotation of said coupling means is releasably permitted, said lost arcuate motion coupling being permissive of normal rotation of said shaft without said shaft being subjected to said spring force, and means for effecting selective normal rotation of said actuating shaft for normal operation of said valve.

3. A valve actuator as set forth in claim 1 wherein said link is of a thermally actuatable type adapted for releasing in response to heat caused by said exigent occurrence.

4. A valve actuator as set forth in claim 3 and further comprising link actuating means associated with said link for generating said heat in response to an exigent occurrence remote from said link.

5. A valve actuator as set forth in claim 4 wherein said link is a fusible link adapted to be remotely actuated, said link including electrothermal actuated means connected to said link for generating said heat in response to an electrical signal provided to said actuator from a location remote from said link.

6. A valve actuator as set forth in claim 5 wherein said fusible link is responsive alternatively to either heat generated by said actuator or heat present exteriorly of said enclosure.

7. A valve actuator as set forth in claim 1, said securement members each comprising a slotted opening for receiving one of said link members by means of said apertures, said slotted opening being disposed for receiving and for permitting removal of said link remote ends only when said link is oriented in a position different from a position securing said camming means.

8. A valve actuator as set forth in claim 1 further comprising a first camming surface associated with said coupling means and rotatable therewith, said camming means comprising a lever and further camming surface adapted for being maintained by said lever against the first said camming surface, said lever being pivotally secured at one end relative to said enclosure, said link being secured to the pivot remote end of said lever.

9. A valve actuator as set forth in claim 8 wherein said further camming surface is carried by said lever.

10. A valve actuator as set forth in claim 8, said coupling comprising a first rotatable member including an arm extending radially therefrom, said spring being positioned for applying a torsional force to said arm for rotation thereof.

11. A valve actuator as set forth in claim 10, said arm having said further camming surface, said lever being engageable with the camming surface of said arm for preventing rotation of said arm.

12. A valve actuator as set forth in claim 11 and further comprising a plate, said enclosure being secured to one face of said plate, said lever being pivotally secured to said plate for movement in a plane intersecting said plate.

13. A valve actuator as set forth in claim 12, said means for securing said actuator to said valve body comprising at least one leg extending between said plate and said valve body, said leg being attached to said valve body.

14. A valve actuator as set forth in claim 12, said arm being journalled for rotation on one side of said plate, said lever being pivoted for movement on the other side of said plate, said plate having an aperture, said lever having a portion extending through said aperture for engaging the camming surface of said arm.

15. A valve actuator as set forth in claim 11, said coupling comprising a first rotatable member secured to said arm and rotatable therewith, said coupling comprising a second rotatable member connected to said valve actuating shaft, said first and second rotatable members being interengageable upon rotation of said first rotational member through a predetermined angular extent.

16. A valve actuator for preselected automatic of a rotary-actuated valve in response to an occurrence of specific exigent type, said valve having a body, a valve element rotatably movable in said body, an actuating shaft extending from said body and rotatable for rotating said valve element between first and second positions, said actuator comprising; shaft coupling means for coupling rotational force to said shaft for rotation thereof only when said coupling means is rotated, a coiled torsion spring for applying a spring force to said coupling means for biasing said coupling means for rotation, camming means for operatively preventing rotation of said coupling means responsive to said spring force when secured and for operatively permitting rotation thereof responsive to said spring force when released, an enclosure for surroundingly and protectively enclosing said coiled torsion spring and camming means for protection from the elements, said spring having a plurality of coils wholly within said enclosure, a releasable link for securing said camming means against movement, said link being positioned exteriorly of said enclosure in a visible, replaceable position for permitting observation and replacement of said link without removal of said enclosure, said link releasing said camming means upon said exigent occurrence, said coupling comprising a first rotatable member including an arm extending radially therefrom, said spring being positioned for applying a torsional force to said arm for rotation thereof, a first camming surface associated with said coupling means and rotatable therewith, said camming means comprising a lever and further camming surface adapted for being maintained by said lever against the first said camming surface, said lever being pivotally secured at one end relative to said enclosure, said link being secured to the pivot remote end of said lever, said spring comprising a spiral torsion spring having a plurality of strip-form coils wound about an axis concentric with said first rotatable member, and outer coil of said spring engaging said arm, and means for direct securement of said valve actuator to said valve body.

17. A valve actuator for preselected automatic actuation of a rotary-actuated valve in response to an occurrence of specific exigent type, said valve having a body, a valve element rotatably movable in said body, an actuating shaft extending from said body and rotatable for rotating said valve element between first and second positions, said actuator comprising: shaft coupling means for coupling rotational force to said shaft for rotation thereof only when said coupling means is rotated, a coiled torsion spring for applying a spring force to said coupling means for biasing said coupling means for rotation, camming means for operatively preventing rotation of said coupling means responsive to said spring force when secured and for operatively permitting rotation thereof responsive to said spring force when released, an enclosure for surroundingly and protectively enclosing said coiled torsion spring and said camming means for protection from the elements, said spring having a plurality of coils wholly within said enclosure, a releasable link for securing said camming means against movement, said link being positioned exteriorly of said enclosure in a visible, replaceable position for permitting observation and replacement of said link without removal of said enclosure, said link releasing said camming means upon said exigent occurrence, a first camming surface associated with said coupling means and rotatably therewith, said camming means comprising a lever and further camming surface adapted for being maintained by said lever against the first said camming surface, said lever being pivotally secured at one end relative to said enclosure, said link being secured to the pivot remote end of said lever, said coupling comprising a first rotatable member including an arm extending radially therefrom, said spring being positioned for applying a torsional force to said arm for rotation thereof, said coupling comprising a first rotatable member secured to said arm and rotatable therewith, said coupling comprising a second rotatable member connected to said valve actuating shaft, said first and second rotatable members being interengageable upon rotation of said first rotational member through a predetermined angular extent, said first and second rotatable members being coaxial, one of said members having at least one arcuate slot, the other of said member carrying an extension fitting within said slot for engagement with the end of said slot upon rotation of said first rotational member through said predetermined angular extent, said slot being of arcuate extent at least as great as said angular extent of rotation of said valve actuating shaft, and means for direct securement of said valve actuator to said valve body.

18. A valve actuator for preselected automatic actuation of a quarter-turn rotary shaft-actuated valve in response to an occurrence of specific exigent type, said valve having a body, a valve element movable in said body between open and shut positions, a shaft extending from said body and rotatable through a predetermined angle constituting a quarter turn for moving said valve element between said open and shut positions for opening and shutting of said valve, respectively, an actuating lever connected to and extending radially from said shaft for selective rotation of said shaft for normal actuation of said valve, said actuator comprising; a torsion spring having a plurality of strip-form coils wound about an axis, an enclosure protectively enclosing said spring, bracket means for securing said enclosure to said valve body, means for securing one end of said spring relative to said enclosure against spring tension, a coupling operatively connected to the other end of said spring and coaxial with said shaft for providing interconnection between said spring and said shaft with rotational lost motion over a degree of rotation at least as great as said predetermined angle, said coupling being driven for rotation, when permitted, by said spring for overcoming said lost motion to cause rotation of said shaft for automatic actuation of said valve, a cam associated with said coupling, said cam being located within said enclosure, a lever arm associated with said cam, said lever arm when secured providing with said cam a camming force preventing rotation of said coupling in response to said spring force, said lever arm including a camming surface contacting said cam within said enclosure, and said lever arm when released reducing said camming force for permitting rotation of said coupling in response to said spring, a releasable link for ordinarily securing said lever arm against movement and operative for releasing said lever arm upon said occurrence, said link being positioned exteriorly of said enclosure for permitting observation and replacement of said link without removal of said enclosure, means for selectively tensioning said spring to a predetermined degree of torsional force; and means for direct securement of said valve actuator to said valve body, said enclosure protecting said spring, said cam, and said camming surface from the elements.

* * * * *